(12) United States Patent
Tehrani et al.

(10) Patent No.: US 11,443,622 B2
(45) Date of Patent: Sep. 13, 2022

(54) SYSTEMS AND METHODS FOR MITIGATING A RISK OF BEING FOLLOWED BY A VEHICLE

(71) Applicant: TOYOTA MOTOR NORTH AMERICA, INC., Plano, TX (US)

(72) Inventors: Farinaz Tehrani, Flower Mound, TX (US); Narendran Narayanasamy, Irvine, CA (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 262 days.

(21) Appl. No.: 16/739,765

(22) Filed: Jan. 10, 2020

(65) Prior Publication Data

US 2021/0217308 A1 Jul. 15, 2021

(51) Int. Cl.
| | |
|---|---|
| *G08G 1/0962* | (2006.01) |
| *B60Q 9/00* | (2006.01) |
| *G06K 9/00* | (2022.01) |
| *G06K 9/62* | (2022.01) |
| *G06N 3/08* | (2006.01) |
| *G08G 1/017* | (2006.01) |
| *G06V 20/56* | (2022.01) |

(52) U.S. Cl.
CPC ........... *G08G 1/09626* (2013.01); *B60Q 9/00* (2013.01); *G06K 9/6217* (2013.01); *G06N 3/088* (2013.01); *G06V 20/56* (2022.01); *G08G 1/017* (2013.01); *G06V 2201/08* (2022.01)

(58) Field of Classification Search
CPC ...... G08G 1/09626; G08G 1/017; B60Q 9/00; G06K 9/00791; G06K 9/6217; G06K 2209/23; G06N 3/088
See application file for complete search history.

(56) References Cited

U.S. PATENT DOCUMENTS

| | | | |
|---|---|---|---|
| 8,466,781 B2 | 6/2013 | Miller et al. | |
| 9,802,609 B2 | 10/2017 | Wolf | |
| 2017/0248949 A1* | 8/2017 | Moran | G08G 1/165 |
| 2018/0222424 A1 | 8/2018 | Kodama et al. | |
| 2018/0345961 A1 | 12/2018 | Saigusa et al. | |
| 2019/0009785 A1* | 1/2019 | Lawrenson | G01S 17/66 |
| 2019/0283747 A1* | 9/2019 | Okabe | B60W 30/12 |
| 2020/0023837 A1* | 1/2020 | Yokoi | B60W 30/0953 |
| 2020/0377120 A1* | 12/2020 | Thorn | G08G 1/166 |

FOREIGN PATENT DOCUMENTS

| | | |
|---|---|---|
| CN | 104331936 A | 2/2015 |
| GB | 1348895 A | 3/1974 |
| WO | 2016093751 A1 | 6/2016 |

* cited by examiner

*Primary Examiner* — Mussa A Shaawat
(74) *Attorney, Agent, or Firm* — Dinsmore & Shohl LLP

(57) ABSTRACT

Embodiments of the disclosure relate to systems and methods for mitigating a risk of being followed using information and notification of being followed by a vehicle. In one embodiment, a computer-implemented method for mitigating a risk of being followed includes the step of detecting, by a plurality of sensors built into a first vehicle, a second vehicle that has been following the first vehicle for a period of time. The method further includes the step of presenting a notification in the first vehicle that it is being followed.

20 Claims, 9 Drawing Sheets

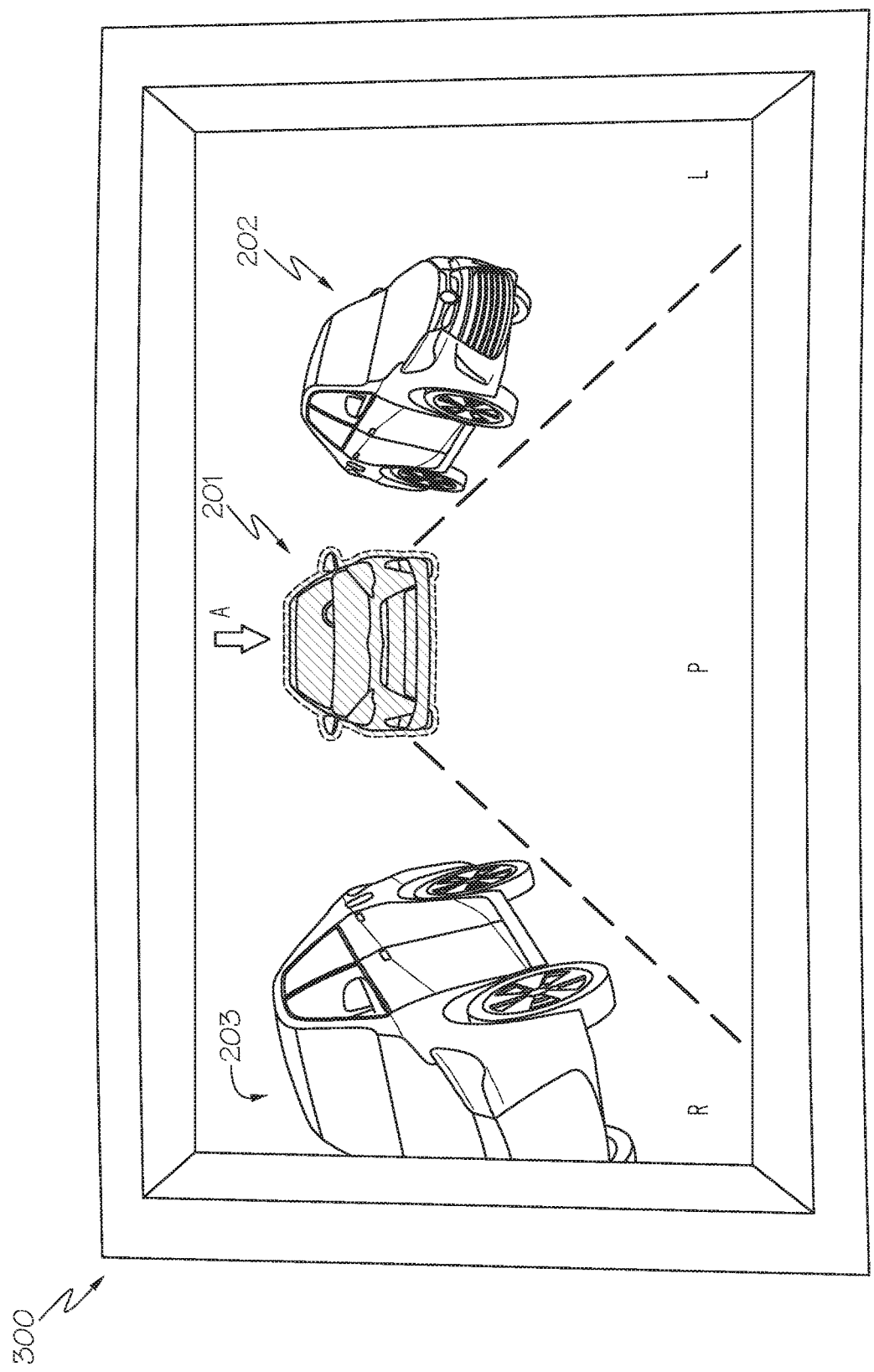

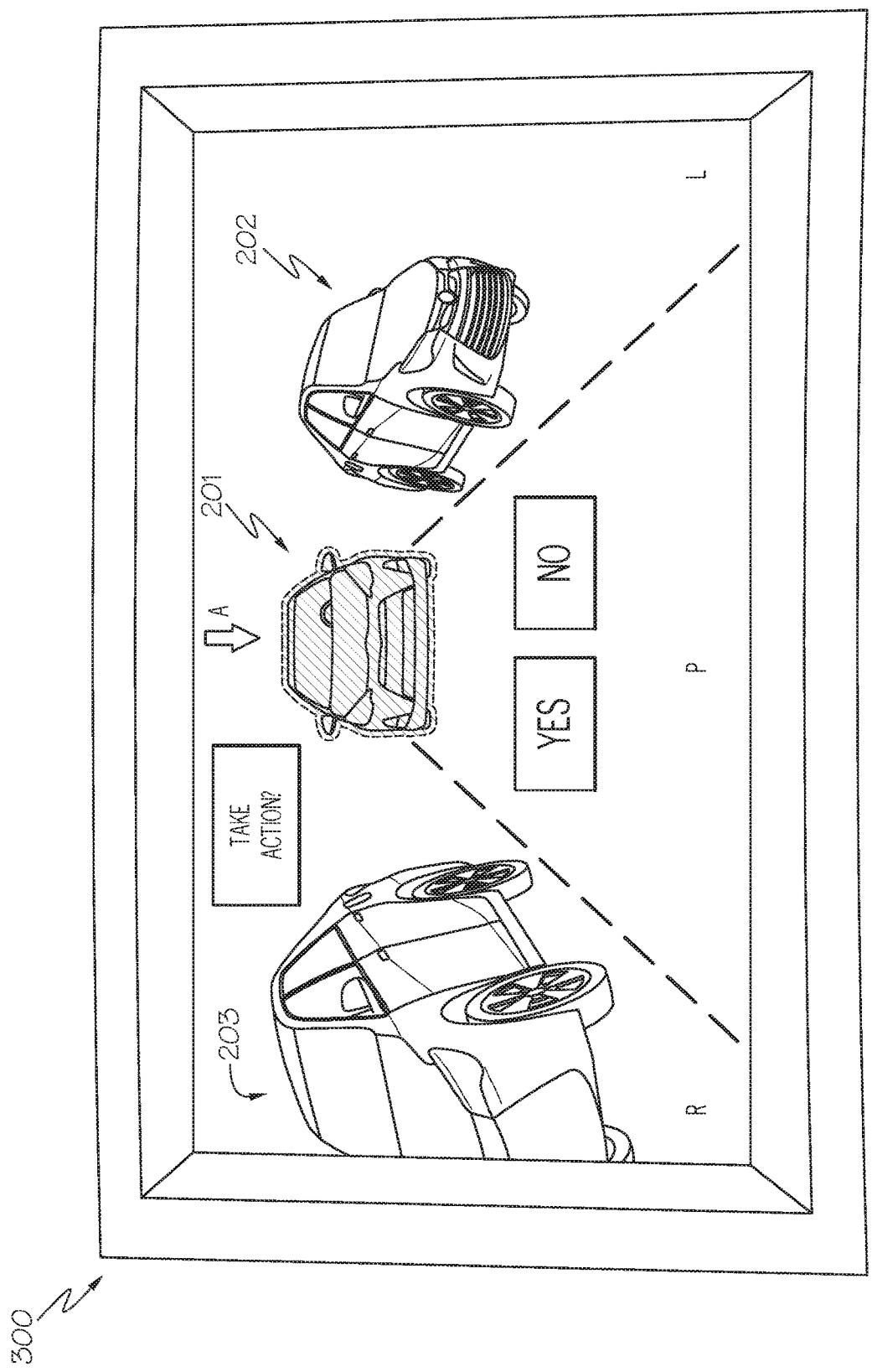

SYSTEMS AND METHODS FOR MITIGATING A RISK OF BEING FOLLOWED BY A VEHICLE

TECHNICAL FIELD

The present specification generally relates to provisioning of information and notification of being followed by a vehicle and, more specifically, to methods and vehicular systems capable of mitigating a risk of being followed by a vehicle and providing a notification of being followed.

BACKGROUND

Driving environments are dynamic environments. In various circumstances one vehicle may be followed by another vehicle, with or without intention. In some circumstances, one vehicle may closely follow another vehicle—a tailgating situation, which can lead to an accident. In some cases, a driver of a vehicle may not know he or she is being tailgated until the situation is viewed through the rear-view mirror. Lack of awareness of tailgating and lack of communication between the two vehicles may lead to an accident. In other circumstances, a vehicle may be followed by another vehicle for a nefarious purpose or any other purpose and the driver of the preceding vehicle may not know he or she is being followed. Regardless of the circumstance, the preceding vehicle may take actions to mitigate the risk of being followed. While general environmental sensing technology and physical mirrors placed in the preceding vehicle are known, more robust vehicular systems and methods for mitigating the risk of being followed by another vehicle are desirable.

SUMMARY

The present specification relates to methods and vehicular systems capable of mitigating a risk of being followed by a vehicle and providing a notification of being followed. In one embodiment, a computer-implemented method for mitigating a risk of being followed includes the step of detecting, by a plurality of sensors built into a first vehicle, a second vehicle that has been following the first vehicle for a period of time. The method further includes the step of presenting a notification in the first vehicle that it is being followed.

In another embodiment, a vehicle comprising a plurality of sensors, a processor, and a non-transitory computer-readable medium is disclosed. The non-transitory computer-readable medium stores instructions that, when executed by the processor, cause the processor to receive data from the sensors, determine the presence of a following vehicle, and present a notification in the vehicle upon determination of the presence of the following vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3C depicts the display of FIG. 3A showing an arrow indicating the following vehicle, according to one or more embodiments shown and described herein;

FIG. 3D depicts the display of FIG. 3A showing a prompt for action to mitigate a risk of being followed, according to one or more embodiments shown and described herein;

DETAILED DESCRIPTION

Embodiments described herein include methods and vehicular systems capable of mitigating a risk of being followed by a vehicle and providing a notification of being followed. A plurality of sensors included in a user's vehicle is used to capture motion of objects and other vehicles in the environment of the user's vehicle. The data from the plurality of sensors is then analyzed by a computing device using unsupervised machine learning models to determine whether it is being followed by another vehicle. Upon determination that the user's vehicle is being followed by another vehicle, the computing device then generates a notification and optionally, a prompt for action on a display within the vehicle.

The phrase "machine learning" as used herein generally refers to an application of artificial intelligence (AI) that provides systems the ability to automatically learn and improve from experience without being explicitly programmed. Machine learning generally focuses on the development of computer programs that can access data and use it learn for themselves. The process of learning may begin with observations or data, such as, for example, direct experience or instruction, in order to look for patterns in data and make better decisions in the future based on the examples that are provided. The primary aim may be to allow the computers learn automatically without human intervention or assistance and adjust actions accordingly.

The phrase "unsupervised machine learning" as used herein generally refers to a type of machine learning algorithm or model used to draw inferences from datasets consisting of input data without assigned labeled responses, used for exploratory data analysis to find hidden patterns or grouping in data. The phrase "unsupervised machine learning model" means a class of solution algorithms that solve problems relating to data organization such as self-organizing map, adaptive resonance theory, and their equivalents.

The phrase "artificial intelligence" as used herein generally refers to a development of computer systems able to perform tasks normally requiring human intelligence.

Figure 1:
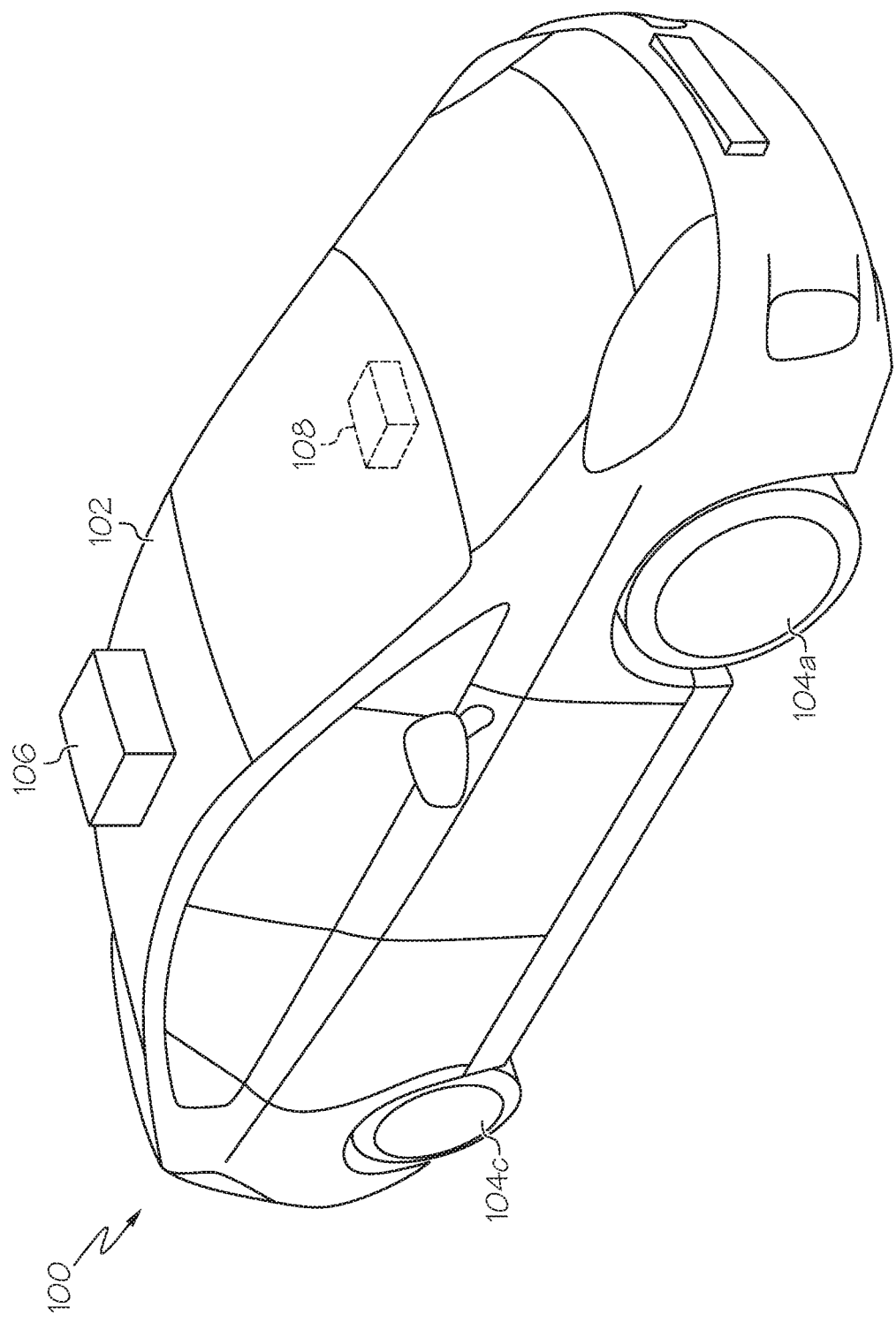
FIG. 1 depicts a perspective view of a vehicle having a sensor configured to detect that the vehicle is being followed by another vehicle, according to one or more embodiments shown and described herein.

Turning now to the drawings wherein like numbers refer to like structures, and particularly to FIG. 1, a perspective view of a vehicle 100 is depicted. The vehicle 100 may be capable of transporting one or more passengers. In non-limiting examples, the vehicle 100 may be a car, a truck, a motorcycle, an aircraft, and a watercraft. In some embodiments, the vehicle 100 may be navigated by an operator, such as a driver, pilot, captain, etc. In other embodiments, the vehicle 100 may be partially autonomous, for example, where the vehicle 100 completes some tasks for a driver, such as parking or keeps the vehicle in a lane. In still other embodiments, the vehicle 100 may be autonomous, for example, where the vehicle 100 operates with no input or minimal input (such as providing destination information or route preferences) from an occupant.

The example vehicle 100 has a chassis 102 and four wheels 104a, 104b, 104c, and 104d. In the embodiment shown in FIG. 1, the vehicle 100 has a plurality of sensors 106 for detecting whether it is being followed. The vehicle 100 may include communication equipment 108 to send and receive information from other vehicles over a vehicle-to-vehicle (V2V) communication network 614, described with respect to FIG. 6. The information may be digital and/or analog in nature and pertain to the objects and other vehicles (such as speed, acceleration, location, and the like) as well as the vehicle 100 (such as operational commands/suggestions). The V2V communication network 614 includes a plurality of nodes, wherein each vehicle acts as a node forming part of a larger communication system that does not rely upon pre-existing communications infrastructure. The V2V communication network 614 is implemented by the National Highway Traffic Safety Administration (NHTSA) as part of new Federal Motor Vehicle Safety Standard (FMVSS) 150.

The communication equipment 108 may include a dedicated short-range communications (DSRC) communication transceiver (not shown) for sending and/or receiving radio signals in a 75 MHz band around 5.9 GHz in device-to-device (D2D) communication such as those implemented by the IEEE 802.11p DSRC standard as required by the V2V communication network 614 under FMVSS 150. The increased transmit power allowed in the 802.11p standard enables longer range communications. A connection between vehicles may utilize sessions that are time and/or location-based. The communication equipment 108 may also include, among other components, an antenna, a modem, LAN port, Wi-Fi card, WiMax card, mobile communications hardware, near-field communication hardware, satellite communication hardware and/or any wired or wireless hardware for communicating with other networks and/or vehicles.

In non-limiting examples, the plurality of sensors 106 may include a camera, an infrared sensor, a LIDAR (LIght Detection And Ranging) sensor, a radar sensor, a sonar sensor and a reflexive sensor. The plurality of sensors 106 are configured to detect motion of objects and other vehicles in the environment of the vehicle 100 to determine whether the vehicle 100 is being followed. Additionally, the plurality of sensors 106 may be configured to return information regarding features (e.g., roadway features such as route, terrain, road markings/lines, curves, and the like) and also detect weather, such as rain, fog, snow and the like.

The camera has an array of sensing devices (e.g., pixels) capable of detecting radiation in an ultraviolet wavelength band, a visible light wavelength band, and/or an infrared wavelength band. The camera may be an omni-directional camera, or a panoramic camera, for example and may have any resolution. In some embodiments, one or more optical components, such as a mirror, fish-eye lens, or any other type of lens may be optically coupled to the camera. The camera may be mounted on a dashboard, on the chassis 102, on a rearview mirror, or elsewhere on the vehicle 100 such that the camera captures image data or video data of an environment of a vehicle 100. The data from the camera may be used by a processor 602 described with respect to FIG. 6 trained with a machine learning algorithm to determine whether the vehicle 100 is being followed, in response to which the processor 602 outputs a notification through an output devices 604 indicating that the vehicle 100 is being followed.

The LIDAR sensor uses pulsed laser light to measure distances from the LIDAR sensor to objects that reflect the pulsed laser light. The LIDAR sensor may be made of solid-state devices with few or no moving parts, including those configured as optical phased array devices where its prism-like operation permits a wide field-of-view without the weight and size complexities associated with a traditional rotating LIDAR system. The LIDAR sensor is particularly suited to measuring time-of-flight, which in turn can be correlated to distance measurements with objects that are within a field-of-view of the LIDAR sensor. By calculating the difference in return time of the various wavelengths of the pulsed laser light emitted by the LIDAR sensor, a digital 3-D representation of a target or environment may be generated. The pulsed laser light emitted by the LIDAR sensor may, in one form, be operated in or near the infrared range of the electromagnetic spectrum, with one example having emitted radiation of about 905 nanometers. Sensors such as the LIDAR sensor can be used by vehicle 100 to provide detailed 3-D spatial information for the identification of objects around the vehicle 100. In some embodiments, data collected using the LIDAR sensor may be compared and/or combined with the image/video data from the camera to generate or refine a simulated model of the vehicle environment. In embodiments, the simulated model may be independently generated from the image/video data.

The sonar sensor uses sound wave propagation to communicate with or detect objects in the surrounding environment of the vehicle 100. The sonar sensor may emit a sound wave at any wavelength (e.g., infrasonic to ultrasonic sound) using a transponder which may be reflected back from objects in the environment. Data collected using the sonar sensor may be compared and/or combined with the image/video data from the camera to generate or refine a simulated model of the vehicle environment.

The radar sensor uses electromagnetic wave (e.g., radio wave) propagation to communicate with or detect objects in the surrounding environment of the vehicle 100. The radar sensor may emit an electromagnetic wave at any wavelength (e.g., 30 Hz to 300 GHz) using a transponder which may be reflected back from objects in the environment. Data collected using the radar sensor may be compared and/or combined with the image/video data from the camera to generate or refine a simulated model of the vehicle environment.

The reflexive sensors include detectors that are capable of determining a status of the vehicle as it travels from one location to another along its commute. For example, the reflexive sensors may measure the speed and/or acceleration of the vehicle on the road (e.g., directly using a GPS sensor or other position detection sensor or by measuring, for example, the magnitude of throttle and/or brake applied by an operator of the vehicle). The reflexive sensors may measure maximum and minimum speeds at various locations along a commute. The reflexive sensors may include gyroscopes, accelerometers, and the like. In some embodiments, the reflexive sensors may measure the force of acceleration during a turn, for example, or may measure the degree of rotation of a steering wheel and the speed of the vehicle to determine how fast an operator drives the vehicle around a turn.

Figure 2:
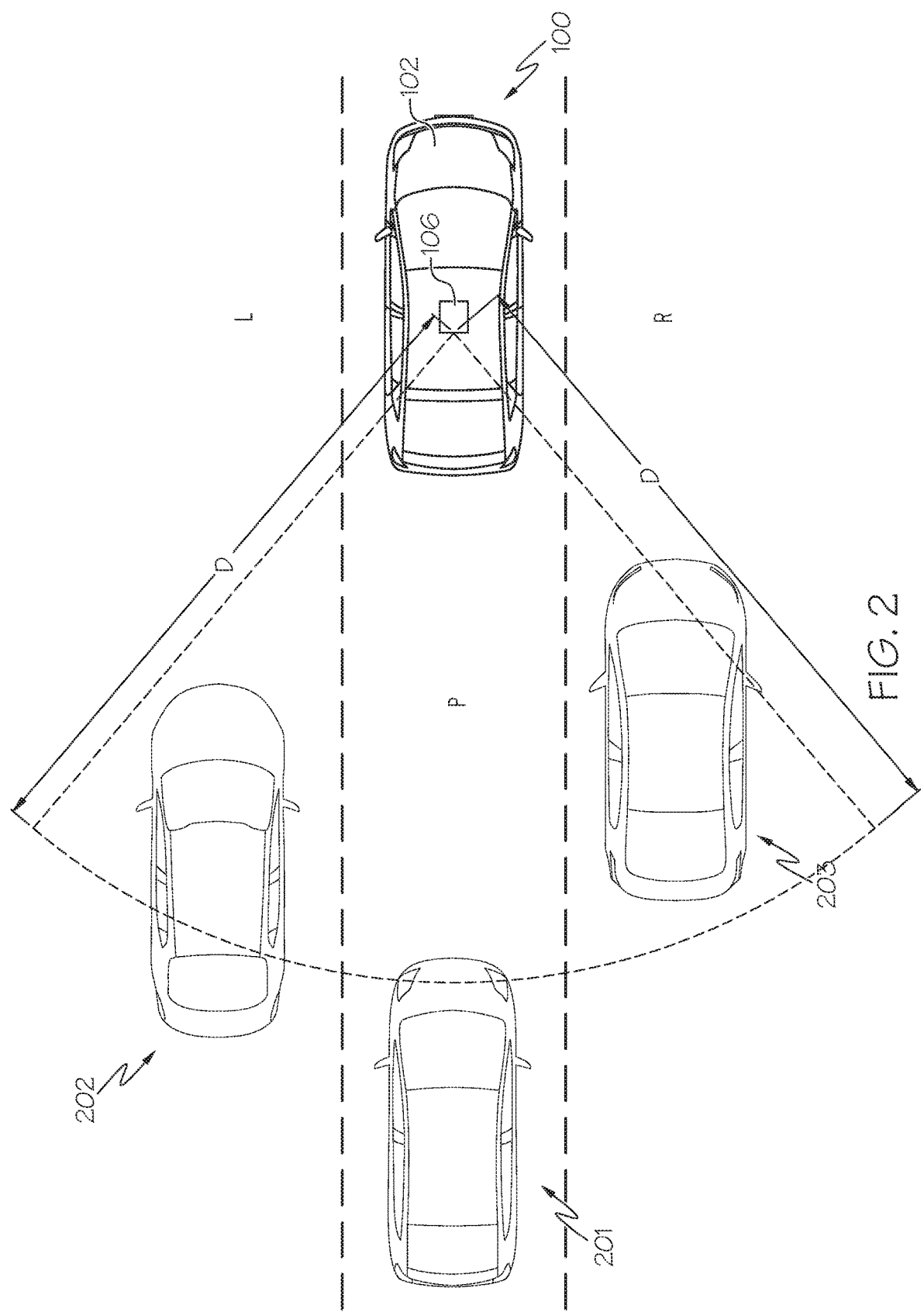
FIG. 2 depicts a top view of traffic situation behind the vehicle with the sensor, according to one or more embodiments shown and described herein.

FIG. 2 depicts a top view of traffic situation behind the vehicle 100. As shown in FIG. 2, the vehicle 100 is trailed by a vehicle 201 moving in the same lane P as the vehicle 100. Additionally, a vehicle 202 is moving in the left lane L of the vehicle 100 and a vehicle 203 is moving in the right lane R of the vehicle 100. The vehicles 201, 202, and 203 are within a radial distance D of the vehicle 100 such that they are detectable by the plurality of sensors 106.

The traffic situation behind the vehicle 100 is then shown in a display 300 of the vehicle 100, as shown in FIGS. 3A-3D. The display 300 may include any medium capable of transmitting an optical output such as, for example, a cathode ray tube, light emitting diodes, a liquid crystal display, a plasma display, or the like. In some embodiments, the display 300 may be part of a heads-up display (HUD) of the vehicle integrated with the windshield or another display device within the vehicle and may include a projector that projects images onto the windshield through one or more lens. The display 300 is configured to display a visualized environment using image/video data and/or a saliency map of the vehicle environment along with a visual alert or warning message, and the like to the driver and may highlight or annotate portions of the visualized environment. The visualization on the display 300 assists in bringing the trailing environment of the vehicle 100 to the driver's attention to help characterize a situation where the vehicle 100 is being followed.

The display 300 may also include one or more input devices. The one or more input units (not shown) may be any device capable of transforming user contact into a data signal such as, for example, a button, a switch, a knob, a microphone or the like. In some embodiments, the one or more input units include a power button, a volume button, an activation button, a scroll button, or the like. The one or more input units may be provided so that the user may interact with the display 300, such as to navigate menus, make selections, set preferences, and other functionality described herein.

Figure 3A:
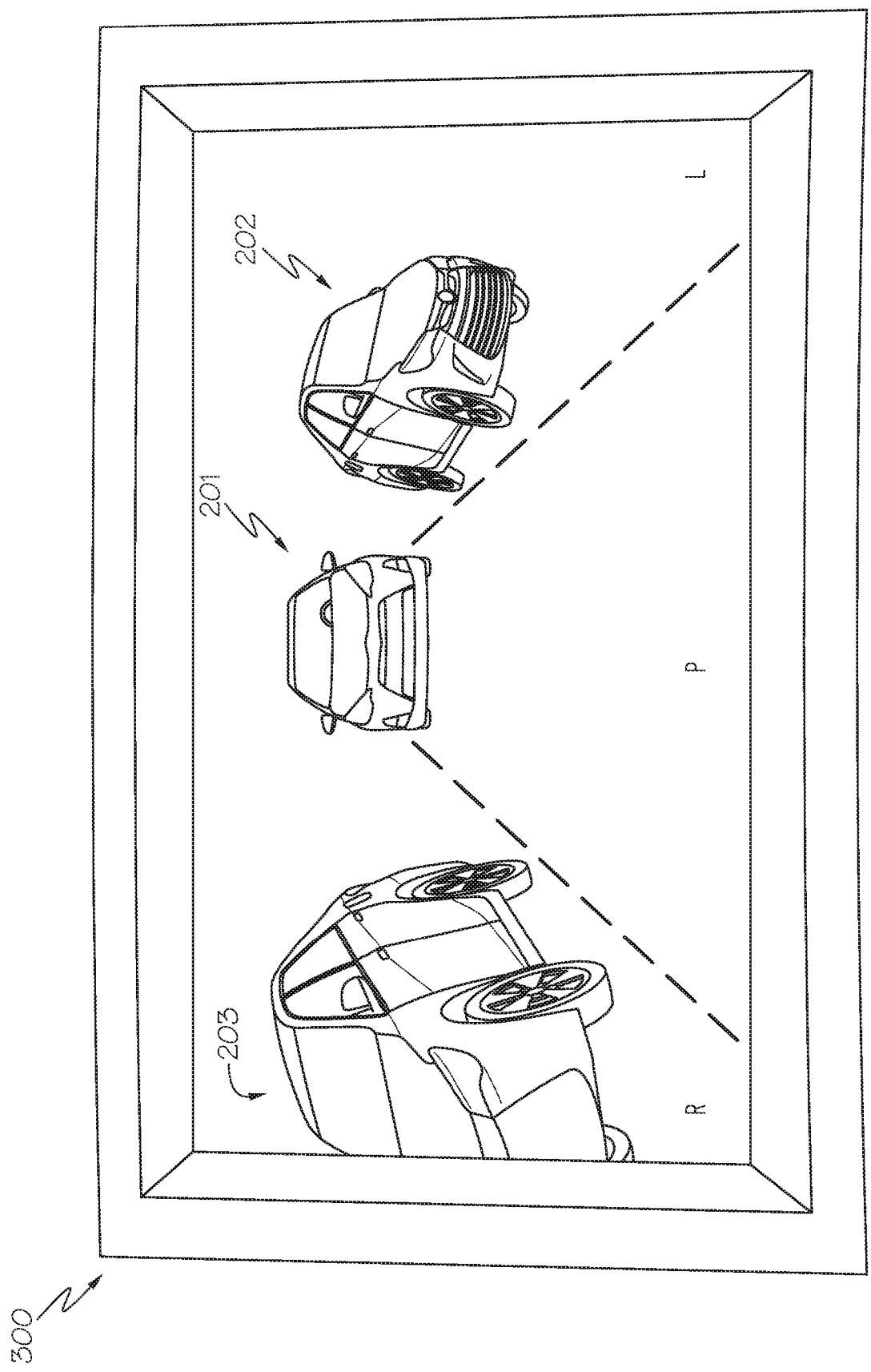
FIG. 3A depicts a display within the vehicle with the sensor showing the traffic situation behind thereof, according to one or more embodiments shown and described herein.

FIG. 3A depicts the display 300 within the vehicle 100 showing the traffic situation including the vehicle 201 moving in the lane P, the vehicle 202 moving in the lane L, and the vehicle 203 moving in the lane R. A computing device 600 within the vehicle 100, described with respect to FIG. 6 below, processes information received from the plurality of sensors 106 to determine that the vehicle 100 is being followed by the vehicle 201 moving in the same lane P. Accordingly, the image of the vehicle 201 is annotated with a highlight (shown in FIG. 3B) and/or an arrow A (shown in FIG. 3C) indicating that the vehicle 201 moving in the same lane P is following the vehicle 100. FIG. 3D depicts the display 300 of FIG. 3A showing a prompt for action to mitigate a risk of being followed.

Figure 4:
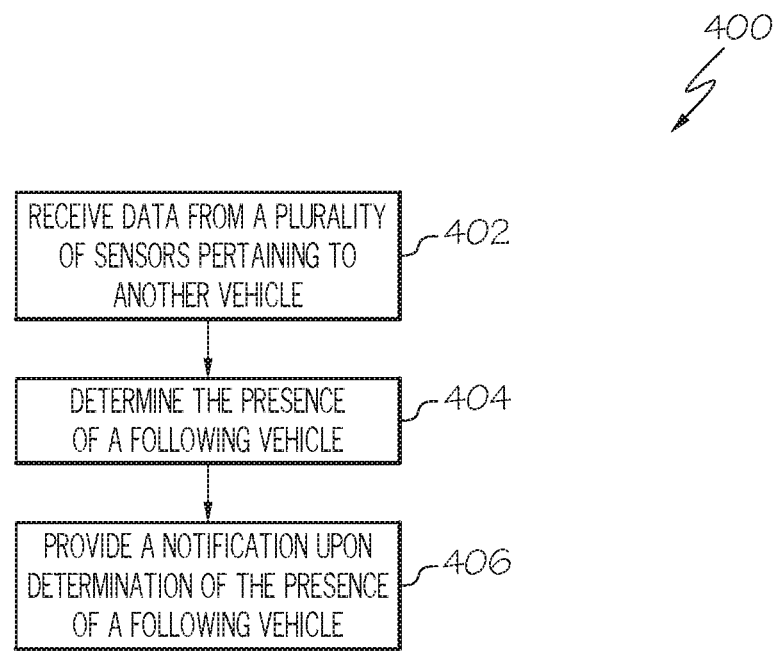
FIG. 4 depicts a flowchart of a method performed by a processor in the vehicle of FIG. 1 using a machine learning algorithm to mitigate a risk of being followed, according to one or more embodiments shown and described herein.

FIG. 4 depicts a flowchart of a method 400 performed by a processor 602 described below with respect to FIG. 6, in the computing device 600 of the vehicle 100. The processor 602 may use a machine learning algorithm to mitigate a risk of being followed. The method 400 begins at step 402 when the processor 602 receives data detected by the plurality of sensors 106. The data pertains to the motion (speed, acceleration, location, a period of time within the environment of the vehicle 100, presence within a predetermined distance of the vehicle 100 during a previous trip, and the like) of other vehicles in the environment of the vehicle 100.

In step 404, a presence of a following vehicle is determined, i.e. the processor 602 determines, based on the received data, whether any of the other vehicles in the environment of the vehicle 100 is following the vehicle 100. In some embodiments, the processor 602 uses an unsupervised machine learning model utilizing a neural network.

Unsupervised machine learning models generally infer a function or relation to describe a hidden structure within unlabeled data. Unsupervised machine learning models explore the data by identifying commonalities in the data and then react based on the presence or absence of such commonalities in each new piece of data, thereby drawing inferences from the unlabeled datasets about the function or relation. Thus, unsupervised machine learning models may be used to determine how a dataset is organized when the data is not labeled and a target input value for the relation is not given. This is in contrast to supervised machine learning models that may apply what has been learned in the past, such as a known training dataset, to new data using labeled examples to predict future events. The unsupervised machine learning model may be used to cluster data objects to summarize and explain key dimensions of the data, for example based on their similarity, such as k-means clustering. The number of clusters may be represented as a parameter of a smoothing effect: the more clusters, the lesser the smoothing effect. This may be implemented, for example, in R, which is a language and environment for statistical computing and graphics, or any other suitable language.

Figure 5:
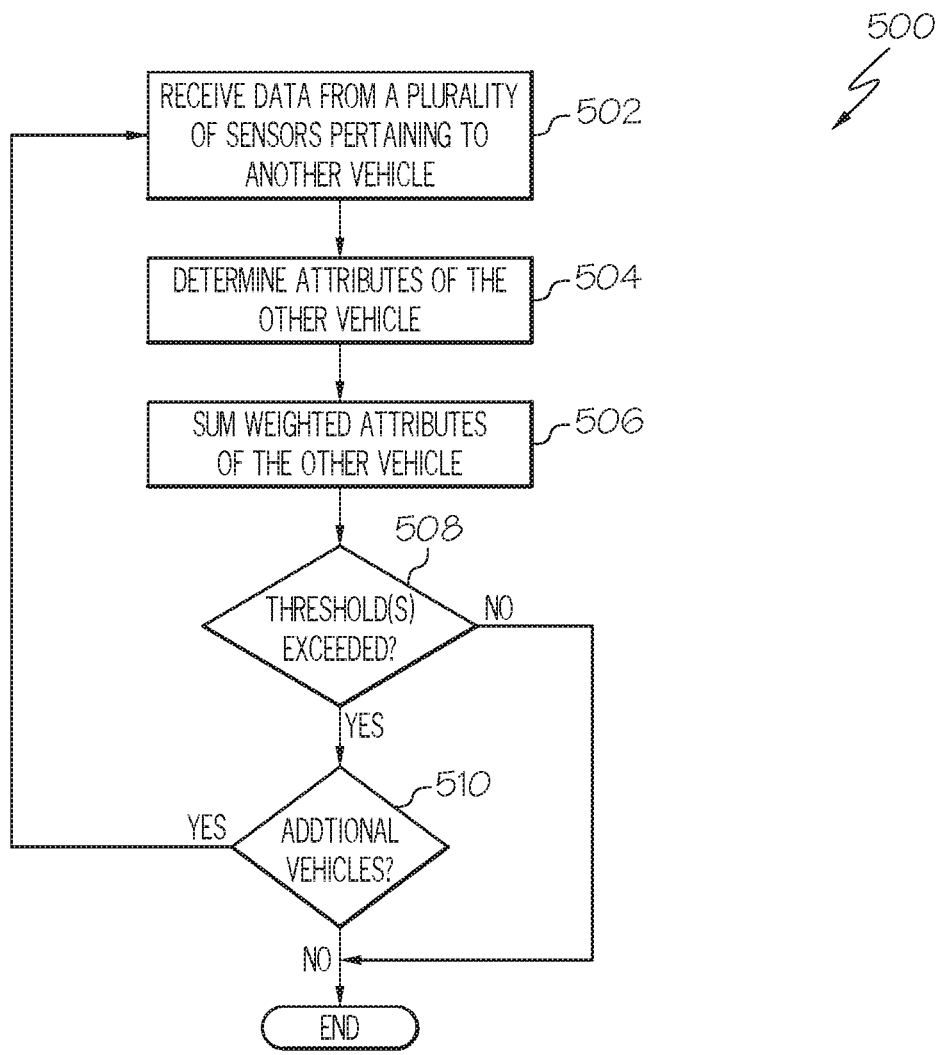
FIG. 5 depicts a flowchart of an example machine learning algorithm used by the processor of FIG. 4 to determine the presence of a following vehicle, according to one or more embodiments shown and described herein.

FIG. 5 depicts a flowchart of an example machine learning algorithm 500 used by the processor 602 to determine the presence of a following vehicle. The algorithm 500 begins at step 502 by receiving data from the plurality of sensors 106 pertaining to another vehicle in the environment of the vehicle 100. In step 504, one or more attributes of the other vehicle are determined. In some embodiments, such attributes may be make, model, color, driver identity as well as operational parameters such as, but not limited to, the motion-related data indicated above. In some embodiments, each of the above-mentioned attributes may be given different weight values when determining the presence of the following vehicle.

In step 506, the sum of the weighted attributes of the other vehicle is then determined. In a first non-limiting example, the period of time spent by the other vehicle within the environment of the vehicle 100 maybe the only attribute determined to be of interest. In a second non-limiting example, likelihood of the presence of the other vehicle within a predetermined distance of the vehicle 100 during a previous trip or period of time maybe an additional or alternative attribute determined to be of interest. In some embodiments, the predetermined distance may be about 100 meters or about 300 feet. The predetermined distance may be set by the vehicle 100 or the other vehicle. The predetermined distance may be different in different situations, such as but not limited to, when the vehicle 100 is in a highway, the vehicle 100 is traveling in an urban street, etc. In a third non-limiting example, the distance of the other vehicle from the vehicle 100 and the period of time spent by the other vehicle within the environment of the vehicle 100 maybe used as attributes to determine the weighted sum. In a fourth non-limiting example, the speed and distance of the other vehicle from the vehicle 100 and the period of time spent by the other vehicle within the environment of the vehicle 100 maybe used as attributes to determine the weighted sum.

In step 508, a determination is made as to whether the weighted sum exceeds one or more predetermined thresholds and if so, the algorithm 500 infers that the vehicle 100 is being followed by the other vehicle. In the first non-limiting example, if the period of time spent by the other vehicle within the environment of the vehicle 100 exceeds about 10 minutes, then the other vehicle may be determined to be a following vehicle. In the second non-limiting example, if the likelihood of the presence of the other vehicle within 100 meters of the vehicle 100 during a previous trip or during the past three days exceeds 50%, then the other vehicle may be determined to be a following vehicle. The one or more predetermined thresholds may also vary depending on different situations, such as but not limited to, when the vehicle 100 is in a highway, an urban street, etc.

If the weighted sum does not exceed the predetermined threshold, the algorithm 500 comes to a conclusion after step 508. In step 510, once it is determined that the weighted sum exceeds the predetermined threshold, the algorithm 500 determines if data from any additional vehicles need to be analyzed. If there are additional vehicles to be analyzed, the algorithm 500 returns to step 502; otherwise the algorithm 500 comes to a conclusion after step 510.

Figure 3B:
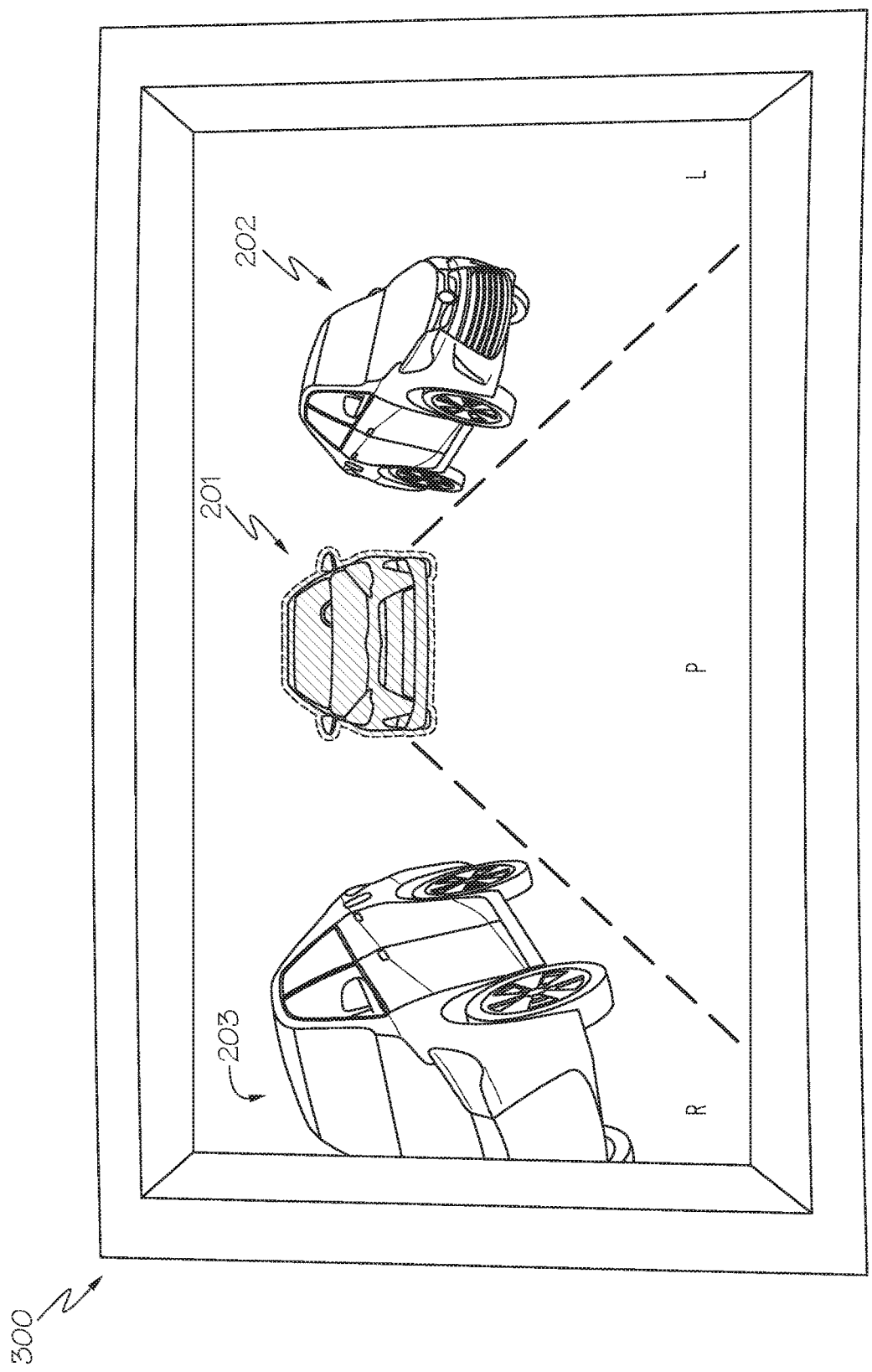
FIG. 3B depicts the display of FIG. 3A showing that the vehicle with the sensor is being followed by another vehicle, according to one or more embodiments shown and described herein.

Returning to FIG. 4, in step 406, once the algorithm 500 infers that the vehicle 100 is being followed by the other vehicle, a notification is provided within the vehicle 100 through output devices 604 described with respect to FIG. 6 below. In some embodiments, the output devices 604 may include the display 300 described above. The notification indicates that the vehicle 100 is being followed. In some embodiments, the notification may also include information on the attributes of the following vehicle such as but not limited to, make, model, color, etc. In some embodiments, the notification may include an annotation over an image of the following vehicle such as a highlight or an arrow A, as shown in FIGS. 3B-3C. In other embodiments, the notification may take the form of warning to the driver of the vehicle 100. As a non-limiting example, the warning may be an audio message or a visual message "YOU ARE CURRENTLY BEING FOLLOWED" displayed on the display 300.

In some embodiments, the notification may further include a prompt for action. The prompt for action may be any of the following: "KEEP LANE" prompting the driver of vehicle 100 to stay in lane P; "SLOW DOWN" prompting the driver of the vehicle 100 to slow down in speed; "MOVE TO SIDE OF THE ROAD" prompting the driver of the vehicle 100 to carefully move to the side of the road to let the following vehicle pass; "CHANGE LANE" prompting the driver of the vehicle 100 to change to the left lane L or the right lane R; "CHANGE DESTINATION" prompting the driver of the vehicle 100 to change destination; "CHANGE ROUTE" prompting the driver of the vehicle 100 to use a different route to the same destination; "CALL EMERGENCY" prompting the driver of the vehicle 100 to call emergency services of 9-1-1; and "CALL POLICE" prompting the driver of the vehicle 100 to call the police or law enforcement.

In some embodiments, the vehicle 100 may be configured to communicate with the following vehicle over the V2V communication network 614. The communication with the following vehicle may facilitate a passing of the following vehicle such that the vehicle 100 is no longer being followed. As a non-limiting example, such communication may take the form of a message "I WILL SLOW DOWN AND CHANGE LANES" sent by the vehicle 100. In some embodiments, the following vehicle may initiate a communication with the vehicle 100 with a message saying "PLEASE CHANGE LANES AND ALLOW ME TO PASS."

Figure 6:
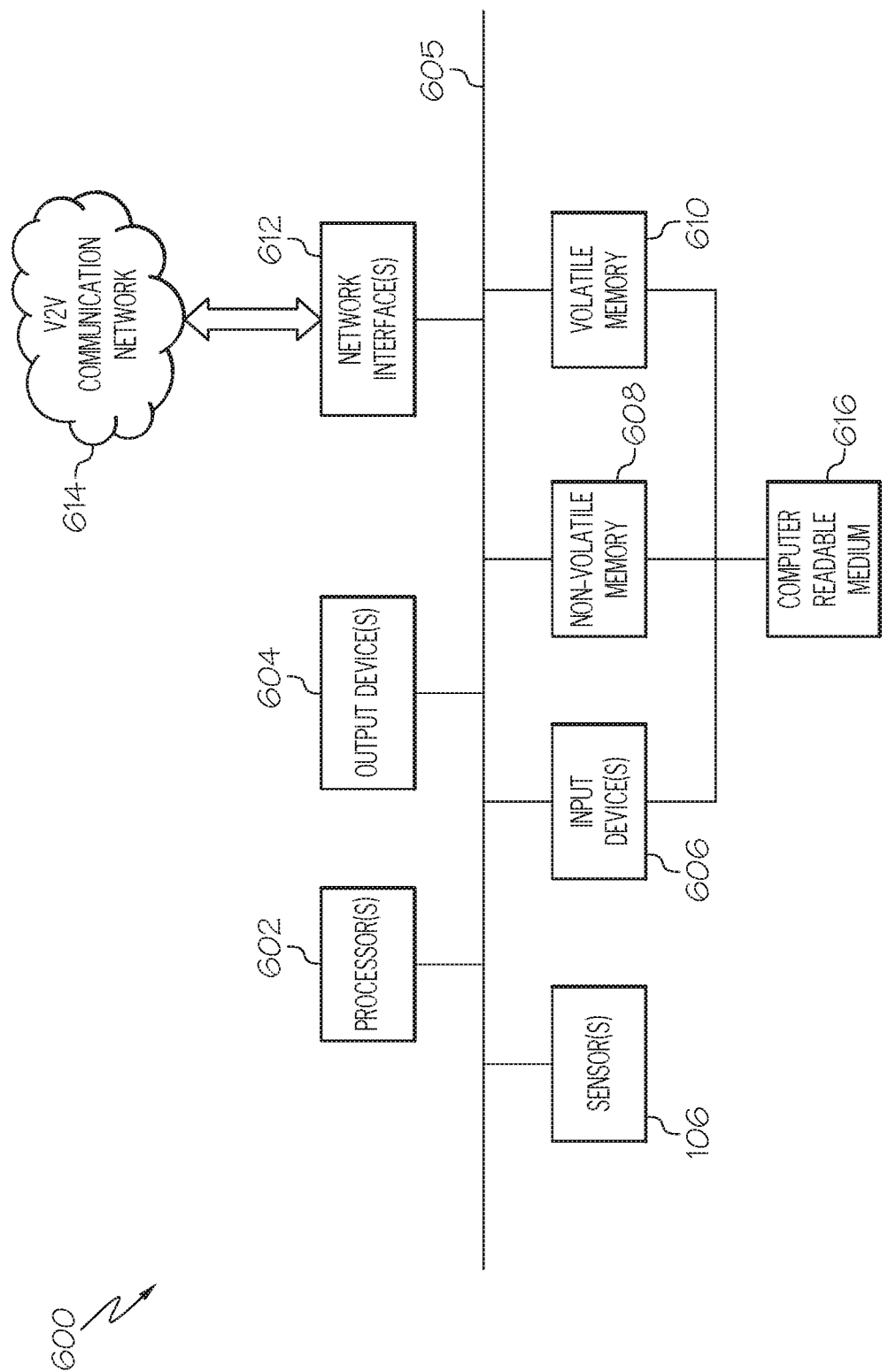
FIG. 6 depicts a block diagram illustrating computing device utilized in the vehicle of FIG. 1 for implementing various systems and processes, according to one or more embodiments shown and described herein.

FIG. 6 depicts a block diagram illustrating computing device 600 utilized in the vehicle 100 and through which embodiments of the disclosure can be implemented, such as in a vehicle control unit (not shown). The computing device 600 includes a communication path 605, the processor 602, the output devices 604, input devices 606, non-volatile memory 608 and/or volatile memory 610, and a network interface 612. As depicted in FIG. 1, the plurality of sensors 106 may be in communication with various components of the computing device 600, such as to provide data relevant to the vehicle 100.

The processor 602 may be any device capable of executing a machine-readable instruction set stored in a computer-readable memory such as the non-volatile memory 608 and/or volatile memory 610. Accordingly, the processor 602 may be an electronic controller, an integrated circuit, a microchip, a computer, or any other computing device. The processor 602 is communicatively coupled to the other components of the computing device 600 by the communication path 605. Accordingly, the communication path 605 communicatively couples any number of the processor 602 with one another, and allows the components coupled to the communication path 605 to operate in a distributed computing environment. Specifically, each of the components may operate as a node that may send and/or receive data.

In some embodiments, the processor 602 is communicatively coupled to the non-volatile memory 608 and/or the volatile memory 610. The non-volatile memory 608 may comprise read-only memory (ROM), flash memories, hard drives, while the volatile memory 610 may comprise random access memory (RAM). The non-volatile memory is configured to store information from the plurality of sensors 106 recorded during past driving events. The driving data 152 may include image data, LIDAR data, speed data, location information, navigation or route information, acceleration or deceleration activity, or the like. The non-volatile memory is configured to store the information for use in training a neural network to determine the presence of a following vehicle.

The non-volatile memory 608 and/or volatile memory 610 are configured to store a machine-readable instruction set that can be accessed and executed by the processors 602. The machine-readable instruction set may comprise logic or algorithm(s) written in any programming language of any generation (e.g., 1GL, 2GL, 3GL, 4GL, or 5GL) such as, for example, machine language that may be directly executed by the processors 602, or assembly language, object-oriented programming (OOP), scripting languages, microcode, etc., that may be compiled or assembled into machine readable instructions and stored in the non-volatile memory 608 and/or volatile memory 610. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The processor 602 in the computing device 130 processes the information detected by the plurality of sensors 106 using processing algorithms stored in the non-volatile memory 608 and/or the volatile memory 610. In some embodiments, images captured by the plurality of sensors 106 may be processed using one or more image processing and image segmentation algorithms. Any known or yet-to-be developed video and image processing algorithms may be applied to the images in order to identify an item or determine a location of objects or other vehicles relative to other items in the driving environment surrounding the vehicle 100. Example video and image processing algorithms include, but are not limited to, kernel-based tracking (mean-shift tracking) and contour processing algorithms. In general, video and image processing algorithms may detect objects and movement from sequential or individual frames of images.

One or more object recognition algorithms may be applied to the images to estimate three-dimensional objects to determine their locations relative to each other. For example, structure from motion, which is a photogrammetric range imaging technique for estimating three-dimensional structures from image sequences, may be used. Additionally, any known or yet-to-be-developed object recognition algorithms may be used to extract the objects, edges, dots, bright spots, dark spots or even optical characters and/or image fragments from the images. For example, object recognition algorithms may include, but are not limited to, scale-invariant feature transform ("SIFT"), speeded up robust features ("SURF"), edge-detection algorithms, and vision algorithms based on deep-learning convolutional neural network model (DCNN).

Further, one or more image segmentation algorithms may be also used to process the image data generated by the plurality of sensors 106. Example segmentation algorithms include, but are not limited to, thresholding algorithms, clustering algorithms, edge-detection algorithms, region-growing algorithms, and dual clustering algorithms. Other example segmentation techniques or algorithms include region-based semantic segmentation, fully convolutional network (FCN)-based semantic segmentation, and weakly supervised semantic segmentation. Embodiments utilizing region-based semantic segmentation may provide semantic based results based on object classification. FCN-based semantic segmentation may classify pixels at an individual level and can be applied to any size image. Weakly supervised semantic segmentation may exploit annotated bounding boxes or image-level labels.

A computer-readable medium 616 may comprise a plurality of computer readable mediums, each of which may be either a computer readable storage medium or a computer readable signal medium. The computer readable medium 616 may reside, for example, within an input device 606, non-volatile memory 608, volatile memory 610, or any combination thereof. The computer readable storage medium 616 can include tangible media that is able to store the machine-readable instruction set associated with, or used by, the vehicle 100. The computer readable storage medium 616 includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. The computer readable storage medium 616 may also include, for example, a system or device that is of a magnetic, optical, semiconductor, or electronic type. The computer readable storage medium 616 is non-transitory, and excludes propagated signals and carrier waves.

The communication path 605 is formed from any medium that is capable of transmitting a signal such as, for example, conductive wires, conductive traces, optical waveguides, or the like. The communication path 605 may also refer to the expanse in which electromagnetic radiation and their corresponding electromagnetic waves traverses. Moreover, the communication path 605 may be formed from a combination of mediums capable of transmitting signals. In one embodiment, the communication path 605 comprises a combination of conductive traces, conductive wires, connectors, and buses that cooperate to permit the transmission of electrical data signals to and from the various components of the computing device 600. Accordingly, the communication path 605 may comprise a bus, such as for example a LIN bus, a CAN bus, a VAN bus, and the like. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like, capable of traveling through a medium. As used herein, the term "communicatively coupled" means that coupled components are capable of exchanging data signals with one another such as, for example, electrical signals via conductive medium, electromagnetic signals via air, optical signals via optical waveguides, and the like.

The output devices 604 may include the display 300 as described above (shown in FIGS. 3A-3D) as well as speakers, headphones, projectors, wearable-displays, holographic displays, and/or printers, for example. The output devices 604 are configured to output information within the vehicle 100, including a notification that the vehicle 100 is being followed. The input devices 606 may include, by way of example, any type of microphone, mouse, keyboard, disk/media drive, memory stick/thumb-drive, memory card, pen, touch-input device, biometric scanner, voice/auditory input device, motion-detector, camera, scale, etc. The input devices 606 are configured to receive commands from a user within the vehicle 100 or response to prompts generated by the output devices 604, as described above. In some embodiments, the commands or responses may be auditory signals received by a microphone, which are subsequently processed by the processor 602 using a known or yet-to-be-developed speech recognition algorithm(s) stored in the non-volatile memory 608 and/or the volatile memory 610.

The computing device 600 is communicatively coupled to the V2V communication network 614 by way of the network interface 612. The components of the computing device 600 may be physically coupled or may be communicatively and operably coupled through the communication path 605 and/or the network 614. The communication equipment 108 (shown in FIG. 1) facilitates communications over the V2V communication network 614 with other vehicles, such as but not limited to the vehicles 201, 202 and 203 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The communication equipment 108 can also be communicatively coupled to any device capable of transmitting and/or receiving data via the V2V communication network 614.

The methods and vehicular systems described herein can be advantageously used to mitigate a risk of being followed by a vehicle and generate a notification and prompt for action in a vehicle that is being followed. The detection and determination of a following situation becomes more robust and proficient through the use of machine learning models. Further, the use of machine learning models enables the vehicle to continually stay vigilant of a following or tailgating situation. As a result, the vehicle can stay on the lookout for as well as become aware of certain vehicles in its vicinity that may be operated for nefarious purposes or if, for example, there is a restraining order on an owner of the following vehicle.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method for mitigating a risk of being followed, comprising:
   detecting, by a plurality of sensors built into a first vehicle, a second vehicle that has been following the first vehicle for a period of time that exceeds a threshold period of time; and
   presenting a notification in the first vehicle that it is being followed.

2. The computer-implemented method of claim 1, wherein the detecting is based on one or more attributes of the second vehicle.

3. The computer-implemented method of claim 2, wherein the one or more attributes of the second vehicle are selected from the following: make, model, color, operational parameters, and driver identity.

4. The computer-implemented method of claim 2, wherein the one or more attributes are given different weight values.

5. The computer-implemented method of claim 1, wherein the detecting is based upon an unsupervised machine learning model utilizing a neural network.

6. The computer-implemented method of claim 1 further comprising presenting a notification in the first vehicle.

7. The computer-implemented method of claim 6, wherein the notification occurs based upon exceeding a first predetermined threshold value of the period of time.

8. The computer-implemented method of claim 1 further comprising presenting a prompt for action in the first vehicle.

9. The computer-implemented method of claim 8, wherein the prompt for action occurs based upon exceeding a second predetermined threshold value of likelihood that the second vehicle was present within a predetermined distance of the first vehicle during a previous trip.

10. The computer-implemented method of claim 8, wherein the prompt for action is selected from one or more of the following: move to the side of the road, change destination, and notify law enforcement.

11. A vehicle comprising a plurality of sensors, a processor, and a non-transitory computer-readable medium storing instructions that, when executed by the processor, cause the processor to:
    receive data from the sensors;
    determine the presence of a following vehicle from the data by determining that the following vehicle has been following the vehicle for a period of time that exceeds a threshold period of time; and
    present a notification in the vehicle upon determination of the presence of the following vehicle.

12. The vehicle of claim 11, wherein the instructions, when executed by the processor further cause the processor to determine the presence of the following vehicle based on one or more attributes of the following vehicle.

13. The vehicle of claim 12, wherein the one or more attributes of the following vehicle are selected from the following: make, model, color, operational parameters, and driver identity.

14. The vehicle of claim 12, wherein the one or more attributes are given different weight values.

15. The vehicle of claim 11, wherein the instructions, when executed by the processor further cause the processor to determine the presence of the following vehicle utilizing an unsupervised machine learning model utilizing a neural network.

16. The vehicle of claim 11, wherein the instructions, when executed by the processor further cause the processor to present a notification in the vehicle.

17. The vehicle of claim 16, wherein the notification occurs based upon exceeding a first predetermined threshold value of the period of time.

18. The vehicle of claim 11, wherein the instructions, when executed by the processor further cause the processor to present a prompt for action in the vehicle.

19. The vehicle of claim 18, wherein the prompt for action occurs based upon exceeding a second predetermined threshold value of likelihood that the following vehicle was present within a predetermined distance of the vehicle during a previous trip.

20. The vehicle of claim 18, wherein the prompt for action is selected from one or more of the following: move to the side of the road, change route, change destination, and notify law enforcement.

* * * * *